US012678924B1

(12) United States Patent
Yeh et al.

(10) Patent No.: US 12,678,924 B1
(45) Date of Patent: Jul. 14, 2026

(54) FORCE ADJUSTMENT DEVICE FOR STAPLE GUN AND STAPLE GUN HAVING THE SAME

(71) Applicant: PAO SHEN ENTERPRISES CO., LTD., Chang Hua (TW)

(72) Inventors: Sheng-Lung Yeh, Chang Hua (TW); Chun-Man Lai, Chang Hua (TW)

(73) Assignee: PAO SHEN ENTERPRISES CO., LTD., Chang Hua (TW)

( * ) Notice: Subject to any disclaimer, the term of this patent is extended or adjusted under 35 U.S.C. 154(b) by 0 days.

(21) Appl. No.: 19/257,621

(22) Filed: Jul. 2, 2025

(30) Foreign Application Priority Data

Apr. 2, 2025 (TW) ................................ 114112879

(51) Int. Cl.
*B25C 5/11* (2006.01)

(52) U.S. Cl.
CPC ..................................... *B25C 5/11* (2013.01)

(58) Field of Classification Search
CPC ....... B25C 5/06; B25C 5/0285; B25C 5/0292; B25C 5/1658; B25C 5/1606; B25C 5/04; B25C 5/11
See application file for complete search history.

(56) References Cited

U.S. PATENT DOCUMENTS

2014/0231486 A1* 8/2014 Burch .................. B25C 5/0285 227/63
2015/0273675 A1* 10/2015 Ebbesson ................. B25C 5/11 227/146

FOREIGN PATENT DOCUMENTS

TW 545350 7/2017

* cited by examiner

*Primary Examiner* — Veronica Martin
(74) *Attorney, Agent, or Firm* — Burris Law, PLLC

(57) ABSTRACT

A force adjustment device adapted to be mounted to a staple gun includes a guide member and an adjustment unit. The guide member has a first end, a second end opposite to the first end, and an abutment surface extending from the first end to the second end. The second end is higher in position than the first end in an up-down direction. The adjustment unit includes an adjustment member movably disposed on the abutment surface, and an operation member. The adjustment member is operable to abut against and limit a range of movement of a force storage unit of the staple gun. The operation member is operable to urge the adjustment member to move to different positions on the abutment surface, so as to adjust the range of movement of the force storage unit.

13 Claims, 11 Drawing Sheets

FORCE ADJUSTMENT DEVICE FOR STAPLE GUN AND STAPLE GUN HAVING THE SAME

CROSS-REFERENCE TO RELATED APPLICATION

This application claims priority to Taiwanese Invention patent application No. 114112879, filed on Apr. 2, 2025, the entire disclosure of which is incorporated by reference herein.

FIELD

The disclosure relates to a staple gun, and more particularly to a force adjustment device for a staple gun and a staple gun having the same.

BACKGROUND

A conventional staple gun disclosed in Taiwanese Utility Model U.S. Pat. No. 545,350 includes a casing having an abutment member and a support member, a handle unit having a hook piece, a spring, a striking member separably engaging the hook piece, a resilient piece abutting against the abutment member, a staple slot, and a retaining piece. When the handle unit is pressed, the striking member is urged thereby to drive the resilient piece to move upward; at the same time, by virtue of the abutment member, a front end of the resilient piece is bent and allowed to bias the striking member. When the handle unit is pressed to pivot downward to abut against the support member and thus slides rearward, the hook piece of the handle unit is disengaged from the striking member. At this time, the striking member is biased by the resilient piece and moves downward to strike out a staple from the staple slot, achieving the purpose of stapling.

Although the conventional staple gun can achieve the expected stapling purpose, the resilient force of the resilient piece and the striking force of the striking member cannot be adjusted. Thus, the conventional staple gun cannot meet different needs.

SUMMARY

Therefore, an object of the disclosure is to provide a force adjustment device for a staple gun that can alleviate at least one of the drawbacks of the prior art.

According to the disclosure, the force adjustment device is adapted to be mounted to a staple gun. The staple gun includes a housing unit that has an accommodation space, a staple-strike piece that is disposed in the accommodation space and that is movable along an up-down direction, a force storage unit that is disposed in the accommodation space and that is operable to resiliently bias the staple-strike piece, a handle unit that is pivotably mounted to the housing unit, and a resilient unit that is disposed in the accommodation space and that is operable to resiliently bias the handle unit. The force adjustment device includes a guide member and an adjustment unit. The guide member is adapted to be disposed in the accommodation space, and has a first end adapted to be adjacent to the staple-strike piece, a second end opposite to the first end, and an abutment surface extending from the first end to the second end. The second end is higher in position than the first end in the up-down direction. The adjustment unit includes an adjustment member adapted to be disposed in the accommodation space, and movably disposed on the abutment surface, and an operation member adapted to be disposed in the accommodation space and extend therefrom to an external environment. The adjustment member is adapted to abut against and limit a range of movement of the force storage unit. The operation member is operable to urge the adjustment member to move to different positions on the abutment surface, so as to adjust the range of movement of the force storage unit.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
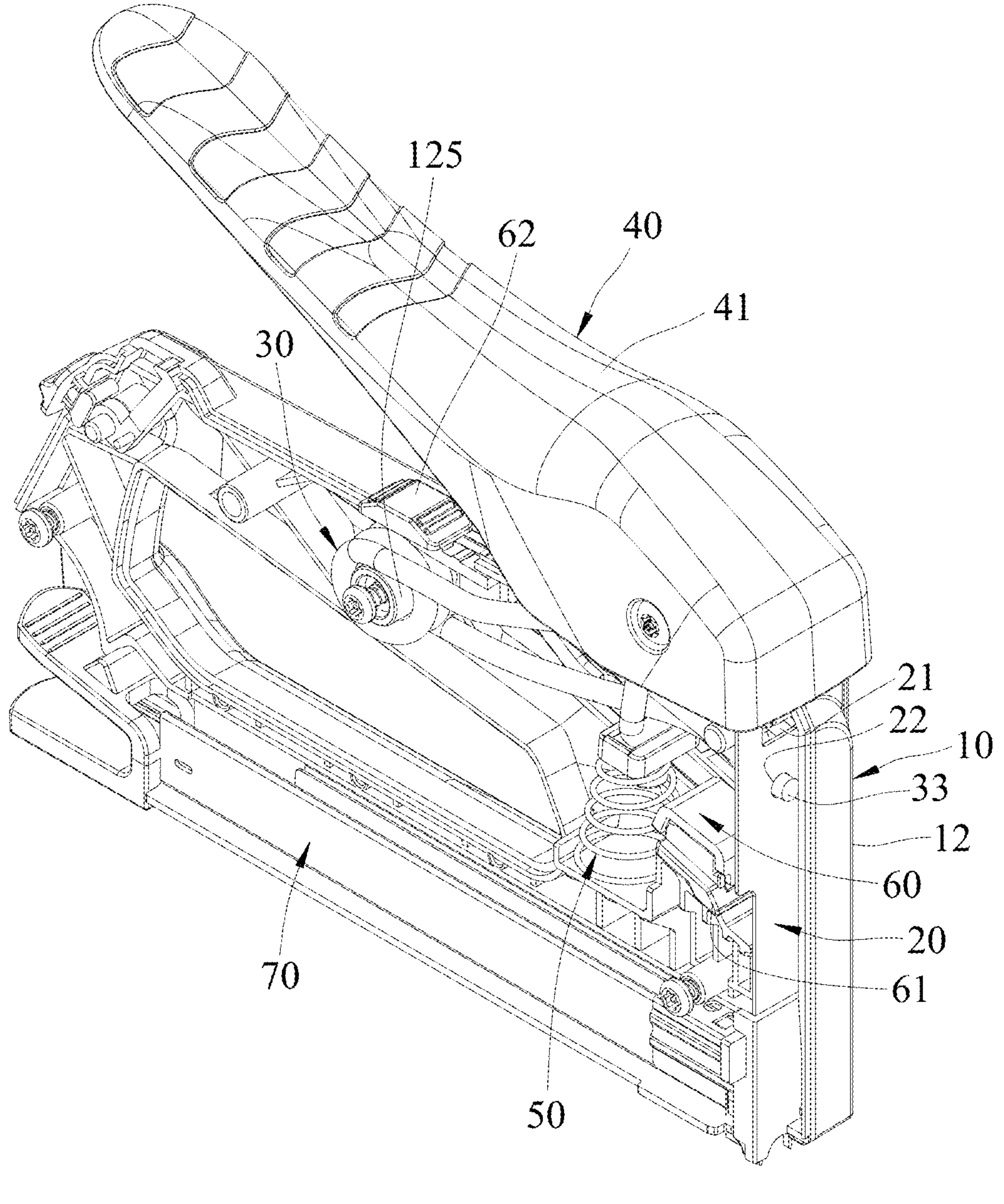
FIG. 1 is a fragmentary perspective view of a first embodiment of a staple gun according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
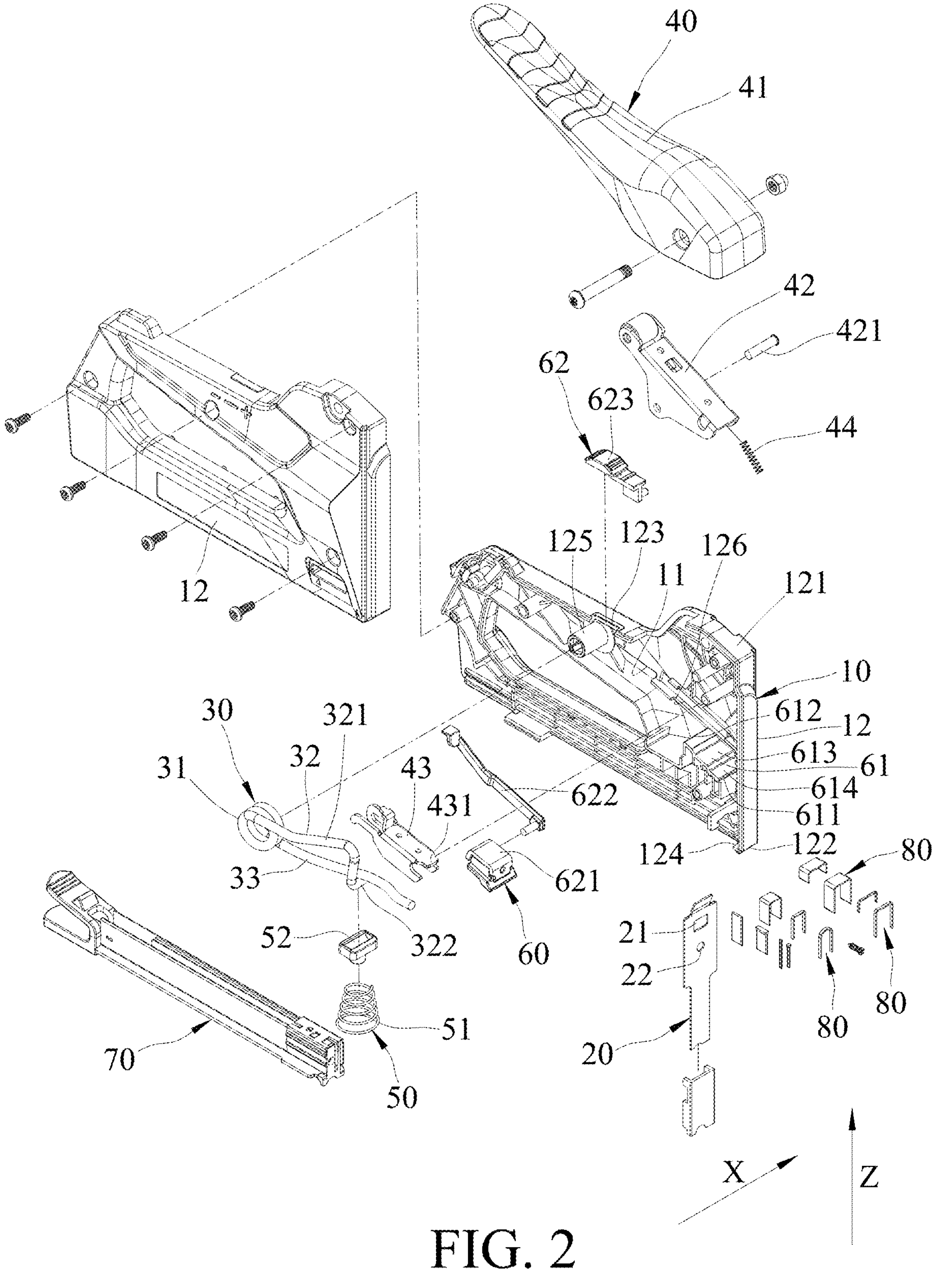
FIG. 2 is an exploded perspective view of the first embodiment.

Referring to FIGS. 1 and 2, a first embodiment of a staple gun according to the disclosure includes a housing unit 10, a staple-strike piece 20, a force control accessory, a handle unit 40, a resilient unit 50, and a staple storage unit 70. The force control accessory includes a force storage unit 30 and a force adjustment device 60.

The housing unit 10 has two shell bodies 12 and an accommodation space 11 that is defined by the shell bodies 12. The shell bodies 12 have a top portion 121, a bottom portion 122 that is opposite to the top portion 121, a slide groove 123 that is formed in the top portion 121 and that is in spatial communication with the accommodation space 11 and an external environment, a staple outlet 124 that is formed in the bottom portion 122 and that is in spatial communication with the accommodation space 11 and the external environment, a pivot axle 125 that is adjacent to the slide groove 123 and that extends in a left-right direction (X), and a guide groove 126 that extends obliquely between the slide groove 123 and the staple outlet 124.

The staple-strike piece 20 is disposed in the accommodation space 11, is movable along an up-down direction (Z) transverse to the left-right direction (X), and corresponds in position to the staple outlet 124 along the up-down direction (Z). The staple-strike piece 20 has an engagement groove 21 and a connection groove 22 that is disposed under the engagement groove 21.

The force storage unit 30 is disposed in the accommodation space 11 and is operable to resiliently bias the staple-strike piece 20 for moving the staple-strike piece 20 along the up-down direction (Z). In some embodiments, the force storage unit 30 is a torsion spring, but is not limited thereto. The force storage unit 30 has an annular portion 31 that is connected to the pivot axle 125 of the housing unit 10, a lever arm 32 that is connected to one end of the annular portion 31, and a driver arm 33 that is connected to another end of the annular portion 31 and that is inserted into the connection groove 22 of the staple-strike piece 20. The lever arm 32 has a main segment 321 that is substantially inverted-L shaped, and a connection segment 322 that is perpendicularly connected to the main segment 321.

The handle unit 40 is pivotably mounted to the housing unit 10, and includes a handle member 41 that is pivotably mounted to the housing unit 10, a support frame 42 that is disposed on an inner side of the handle member 41, and that is pivotably mounted to the housing unit 10, an engagement member 43 that is pivotably mounted to the support frame 42 and the housing unit 10, and a spring 44 that is connected between the support frame 42 and the engagement member 43. The support frame 42 has a press portion 421 that is disposed on a bottom end thereof, and that abuts against the main segment 321 of the force storage unit 30. The engagement member 43 has an engagement end 431 that is detachably inserted into the engagement groove 21 of the staple-strike piece 20. The handle unit 40 is operable to make the force storage unit 30 bias the staple-strike piece 20.

The resilient unit 50 is disposed in the accommodation space 11, and is operable to resiliently bias the force storage unit 30 and the handle unit 40. The resilient unit 50 includes a resilient member 51 and an abutment seat 52 that is mounted to the resilient member 51. In some embodiments, the resilient member 51 is a compressing spring. The connection segment 322 of the force storage unit 30 abuts against one side of the abutment seat 52 opposite to the resilient member 51.

Figure 3:
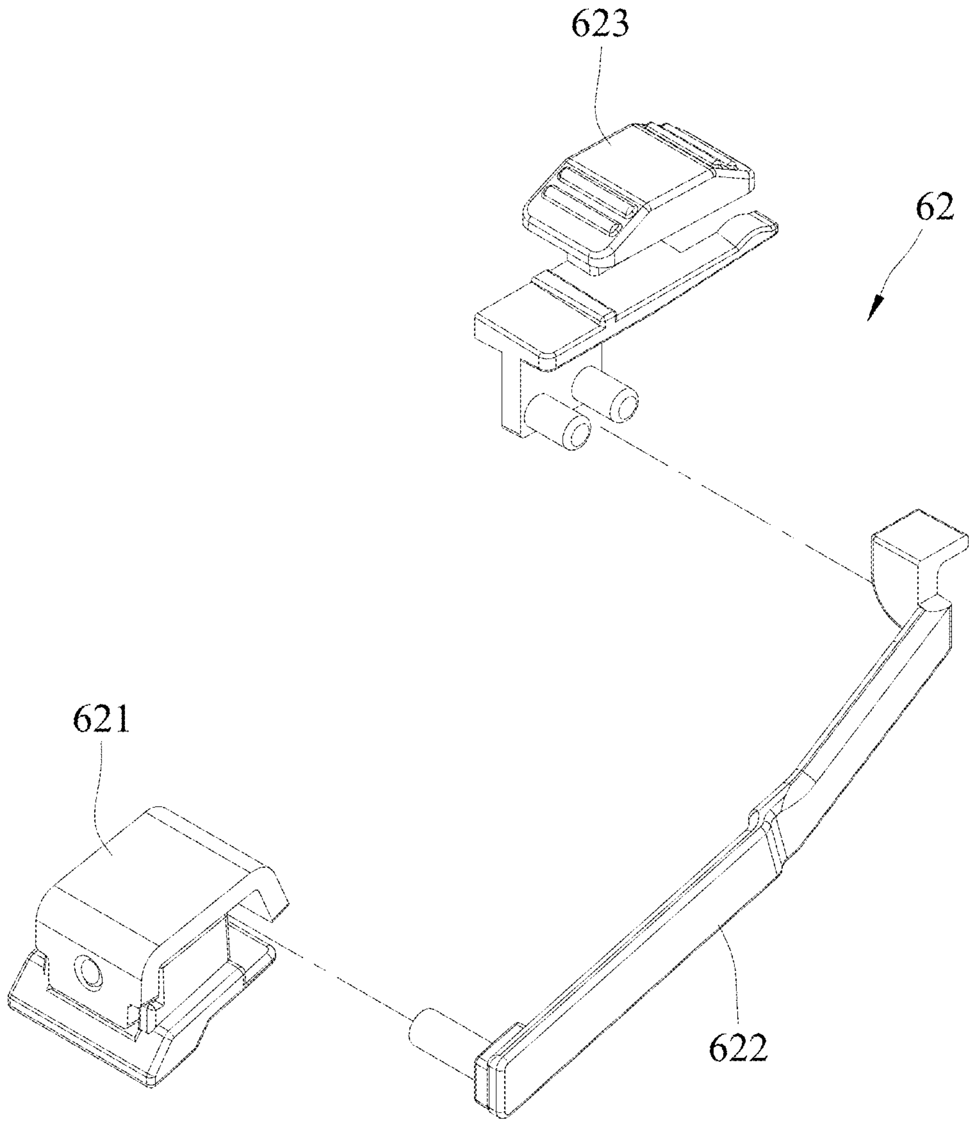
FIG. 3 is a fragmentary exploded perspective view of a force adjustment device of the first embodiment.

Referring to FIGS. 2 and 3, the force adjustment device 60 includes a guide member 61 and an adjustment unit 62. The guide member 61 is disposed in the accommodation space 11, and has a first end 611 adjacent to the staple-strike piece 20, a second end 612 opposite to the first end 611, and an abutment surface 613 extending from the first end 611 to the second end 612. The second end 612 is higher in position than the first end 611 in the up-down direction (Z). In some embodiments, the guide member 61 is integrally formed on one of the shell bodies 12, and protrudes towards the other one of the shell bodies 12 (i.e., is integrally formed in the accommodation space 11), but is not limited thereto. The abutment surface 613 of the guide member 61 has at least two abutment portions 614 (see FIG. 4) that are stepped, and heights of the abutment portions 614 in the up-down direction (Z) are different. The adjustment unit 62 includes an adjustment member 621 disposed in the accommodation space 11 and movably disposed on the abutment surface 613, a connection member 622 pivotably connected to the adjustment member 621 and slidably disposed in the guide groove 126, and an operation member 623 disposed in the accommodation space 11 (specifically, slidably disposed in the slide groove 123), connected to one side of the connection member 622 opposite to the adjustment member 621, and extending from the accommodation space 11 to the external environment. The adjustment member 621 is operable to abut against and limit the range of movement of the driver arm 33 of the force storage unit 30. The operation member 623 is operable to urge the adjustment member 621 to move to different positions on the abutment surface 613 (specifically, to move between the abutment portions 614), thereby adjusting the range of movement of the force storage unit 30.

The staple storage unit 70 is detachably mounted to the housing unit 10, and stores multiple staples 80. The staple storage unit 70 may store different types of the staples 80 (see FIG. 2).

For a further understanding of the functions, technical means, and expected effects achieved by the combination of the components of the present disclosure, the following detailed description is provided, which can enable a deeper and more concrete understanding of the present disclosure.

Figure 4:
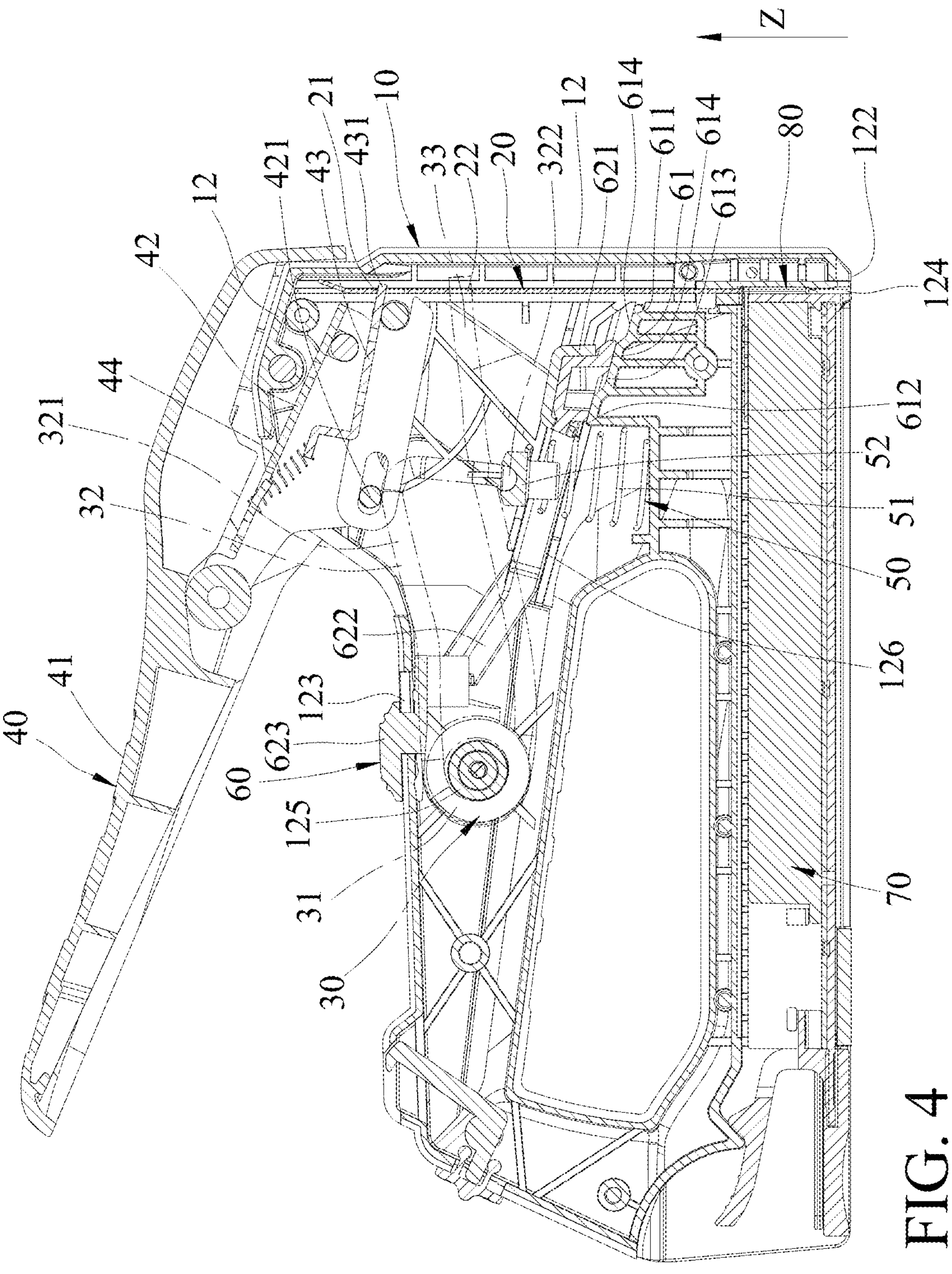
FIG. 4 is a schematic sectional view of the first embodiment.
Figure 5:
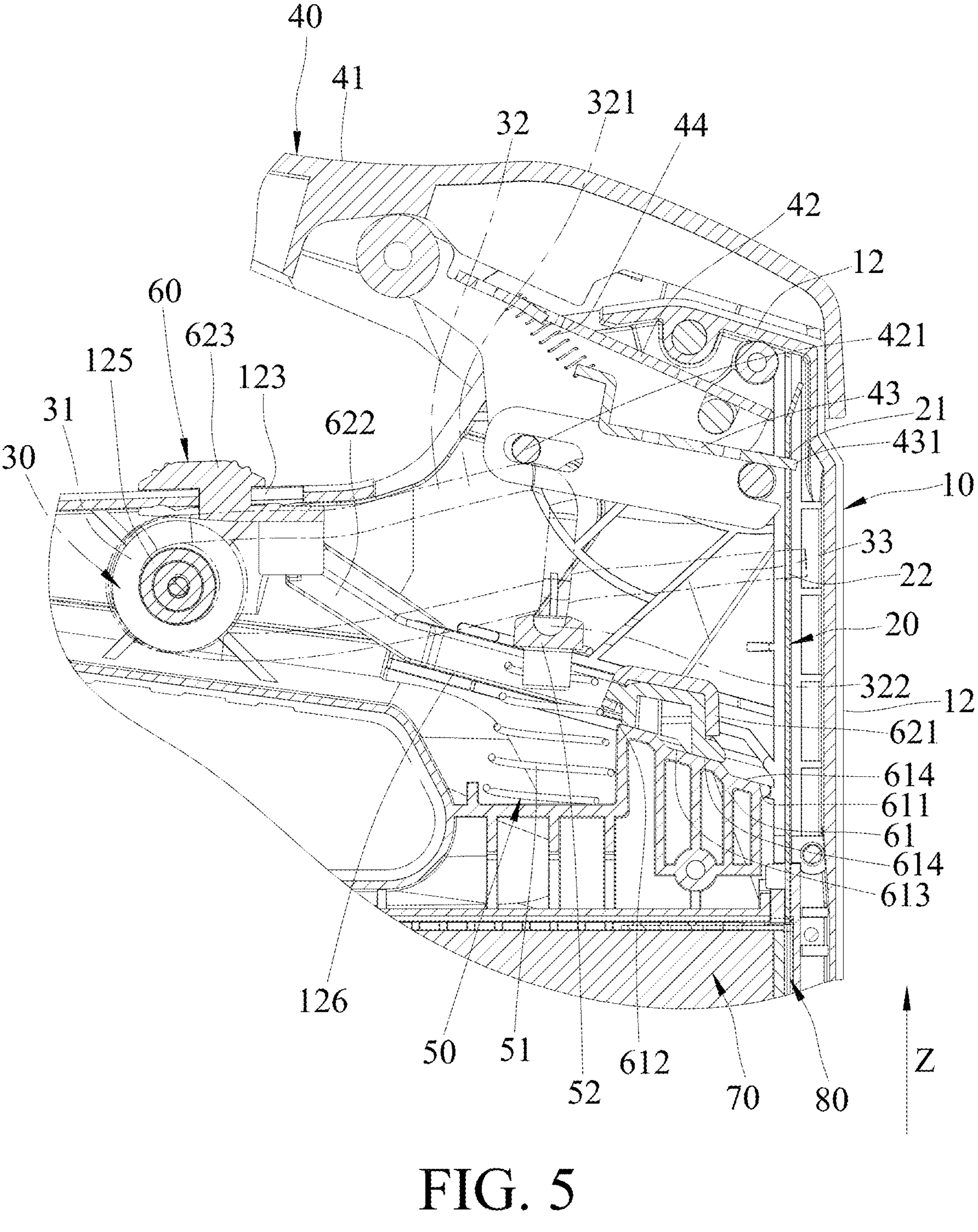
FIG. 5 is an enlarged fragmentary view of FIG. 4.

Referring to FIGS. 1, 4 and 5, when the handle member 41 of the handle unit 40 is at an initial position, the press portion 421 is at an original position, the main segment 321 of the lever arm 32 abuts against the press portion 421, the staple-strike piece 20 is at an un-striking position, and a bottom end of the staple-strike piece 20 is slightly higher in position than the staples 80 in the staple storage unit 70 along the up-down direction (Z). The engagement end 431 of the engagement member 43 is inserted into the engagement groove 21 of the staple-strike piece 20. The abutment seat 52 of the resilient unit 50 abuts against the connection segment 322 of the lever arm 32.

When the handle member 41 of the handle unit 40 is operated (e.g., is pressed), the support frame 42 is urged to pivot relative to the housing unit 10, and then the press portion 421 presses against the main segment 321 of the lever arm 32, so that the lever arm 32 moves toward the bottom portion 122 of the case bodies 12 and thus presses against the resilient member 51 through the abutment seat 52, and that the resilient member 51 is compressed and accumulates a restoring force for resiliently biasing the force storage unit 30 toward the top portion 121 of the case bodies 12. At the same time, the engagement end 431 of the engagement member 43 is urged by the handle member 41 through the support frame 42 to move toward the top portion 121 and rearward, so that the staple-strike piece 20 is urged thereby to drive the driver arm 33 of the force storage unit 30 to move toward the top portion 121, and thus the force storage unit 30 accumulates a restoring force for resiliently biasing the staple-strike piece 20 toward the staple outlet 124.

Figure 6:
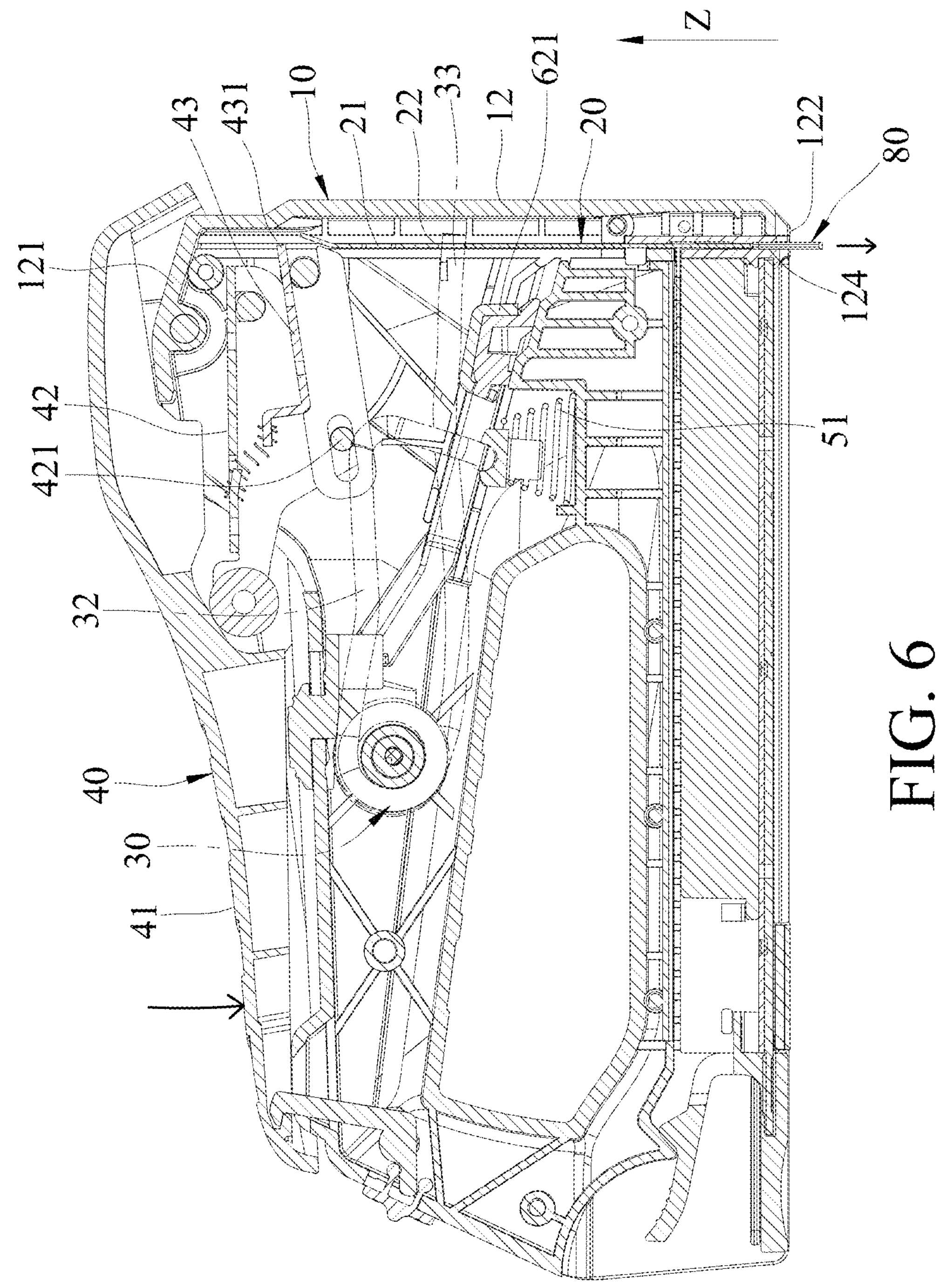
FIG. 6 is a schematic sectional view illustrating a handle unit of the first embodiment being operated.

Referring to FIGS. 4 to 6, when the handle member 41 is pivoted to an operation position, the engagement end 431 of the engagement member 43 is detached from the engagement groove 21 of the staple-strike piece 20, and the driver arm 33 of the force storage unit 30 resiliently biases the staple-strike piece 20 toward the staple outlet 124 by the restoring force, so that the staple 80 located at the staple outlet 124 is struck out. At the same time, the driver arm 33 of the force storage unit 30 moves toward the bottom portion 122 until the driver arm 33 abuts against and is limited by the adjustment member 621 (i.e., is not able to move anymore).

When the handle member 41 is operated to pivot from the operation position to the initial position (i.e., is released, see FIGS. 6 to 4), the resilient member 51 biases the abutment seat 52 and the force storage unit 30 toward the top portion 121 through the restoring force, so that the support frame 42, the engagement member 43 and the handle member 41 are urged to pivot, and that the driver arm 33 is biased by the lever arm 32 to urge the staple-strike piece 20 toward the top portion 121 until the engagement end 431 of the engagement member 43 is inserted into the engagement groove 21 of the staple-strike piece 20.

Figure 7:
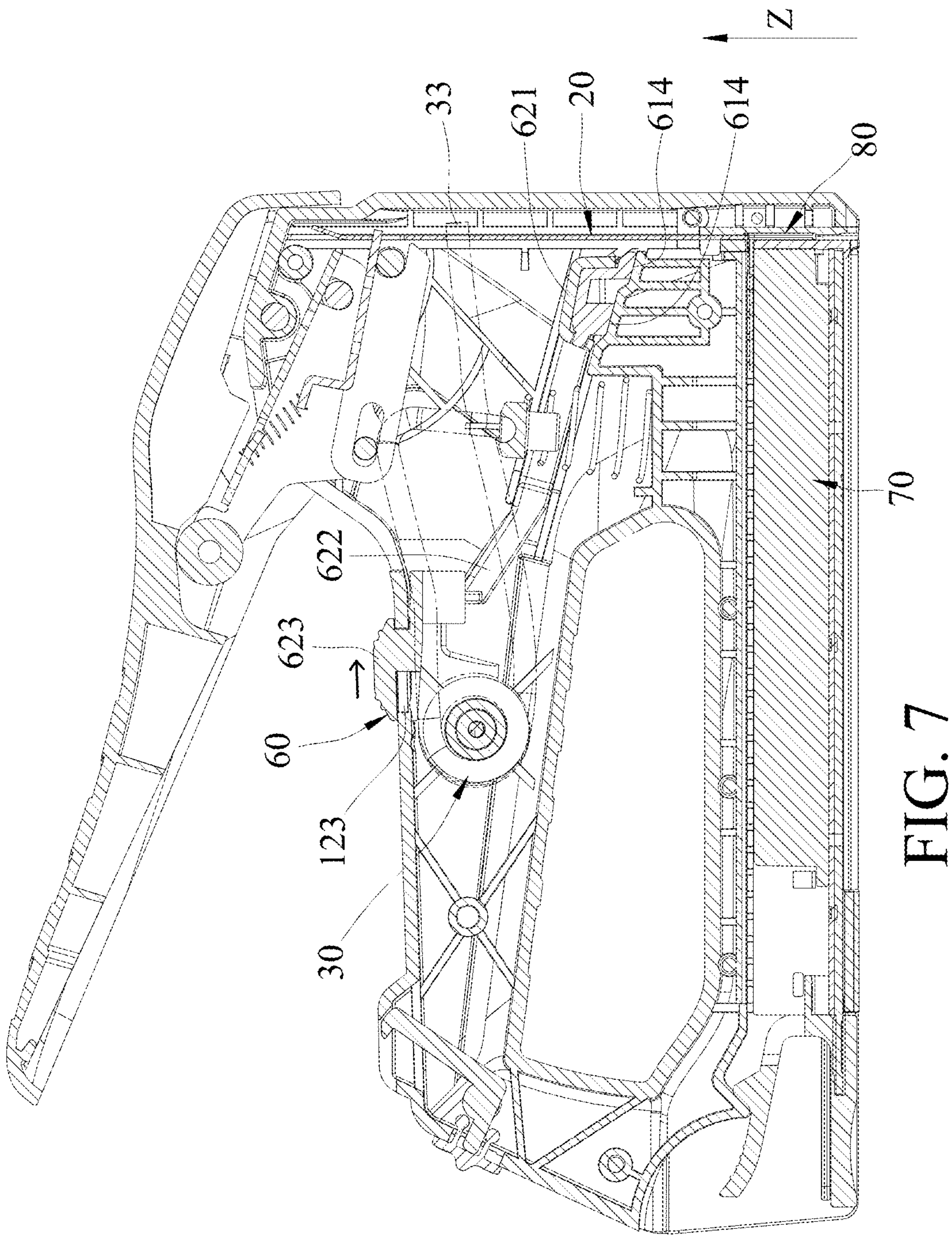
FIG. 7 is a schematic sectional view illustrating the force adjustment device being operated.
Figure 8:
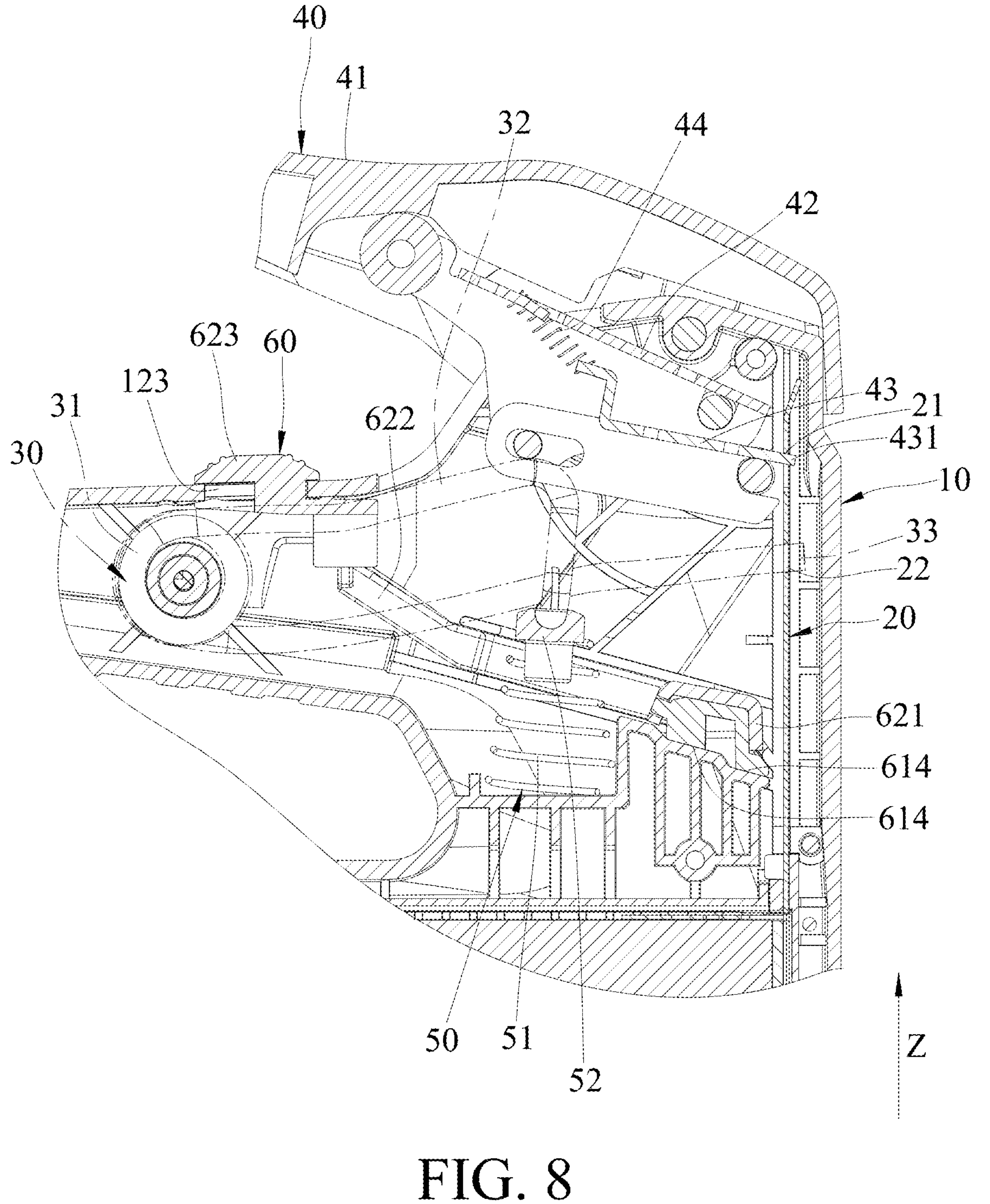
FIG. 8 is an enlarged fragmentary view of FIG. 7.

Referring further to FIGS. 7 and 8, since the staple storage unit 70 may store different types of the staples 80 (see FIG. 2), different striking depth and striking strength are required according to the staples 80 used. The user may operate the force adjustment device 60 to meet such requirements. Specifically, the operation member 623 is slid relative to the guide groove 126 to urge the connection member 622, thereby driving the adjustment member 621 to move to another abutment portion 614, so that the range of movement of the force storage unit 30 is adjusted, and thus the staple-strike piece 20 may provide different striking depth and striking strength.

When the handle unit 40 is operated, the force storage unit 30 accumulates the restoring force for resiliently biasing the staple-strike piece 20 toward the staple outlet 124. The main segment 321 of the lever arm 32 is urged by the handle unit 40 to thereby accumulate the restoring force for resiliently biasing the driver arm 33.

Figure 9:
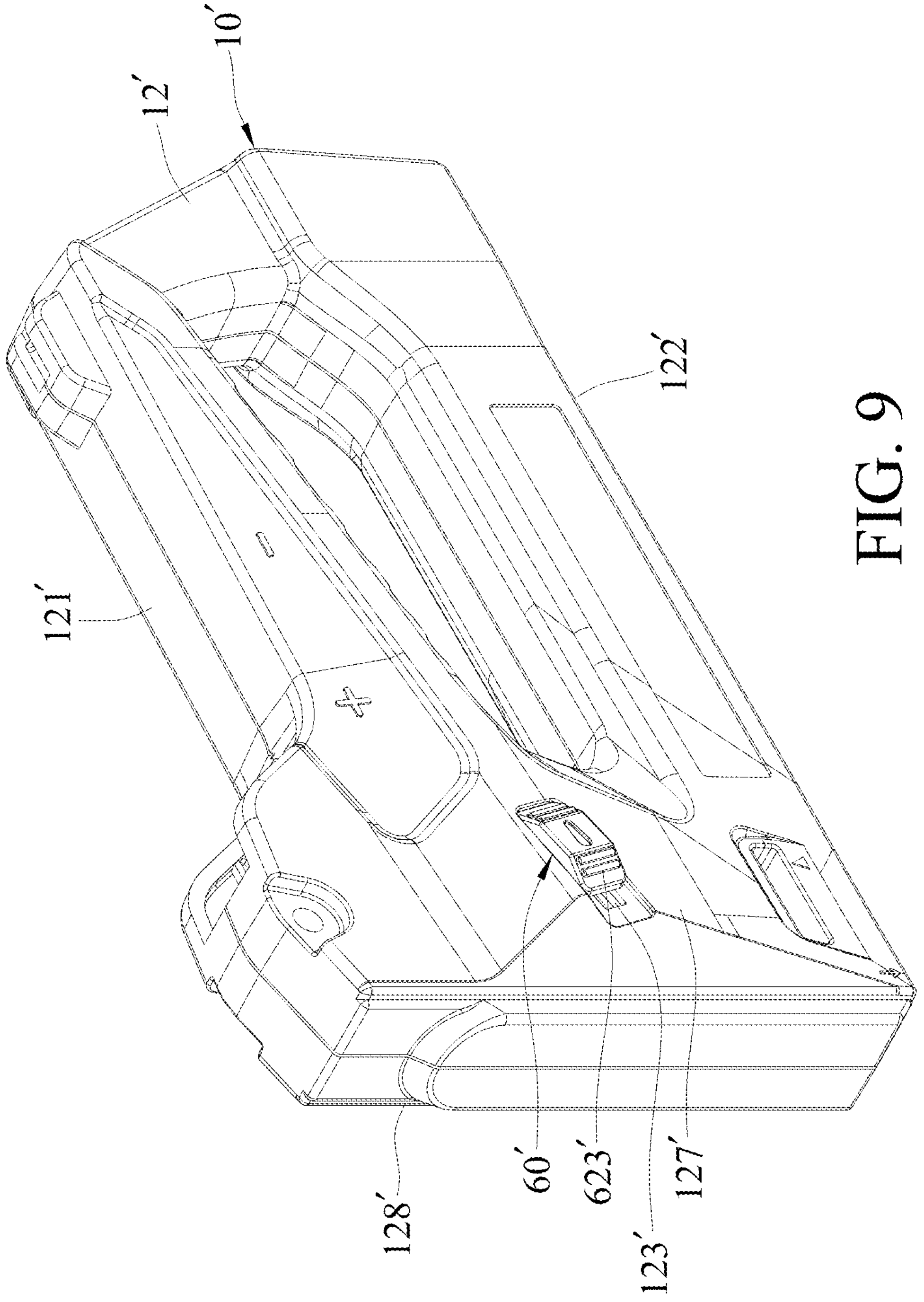
FIG. 9 is a fragmentary perspective view of a second embodiment of the staple gun according to the disclosure.
Figure 10:
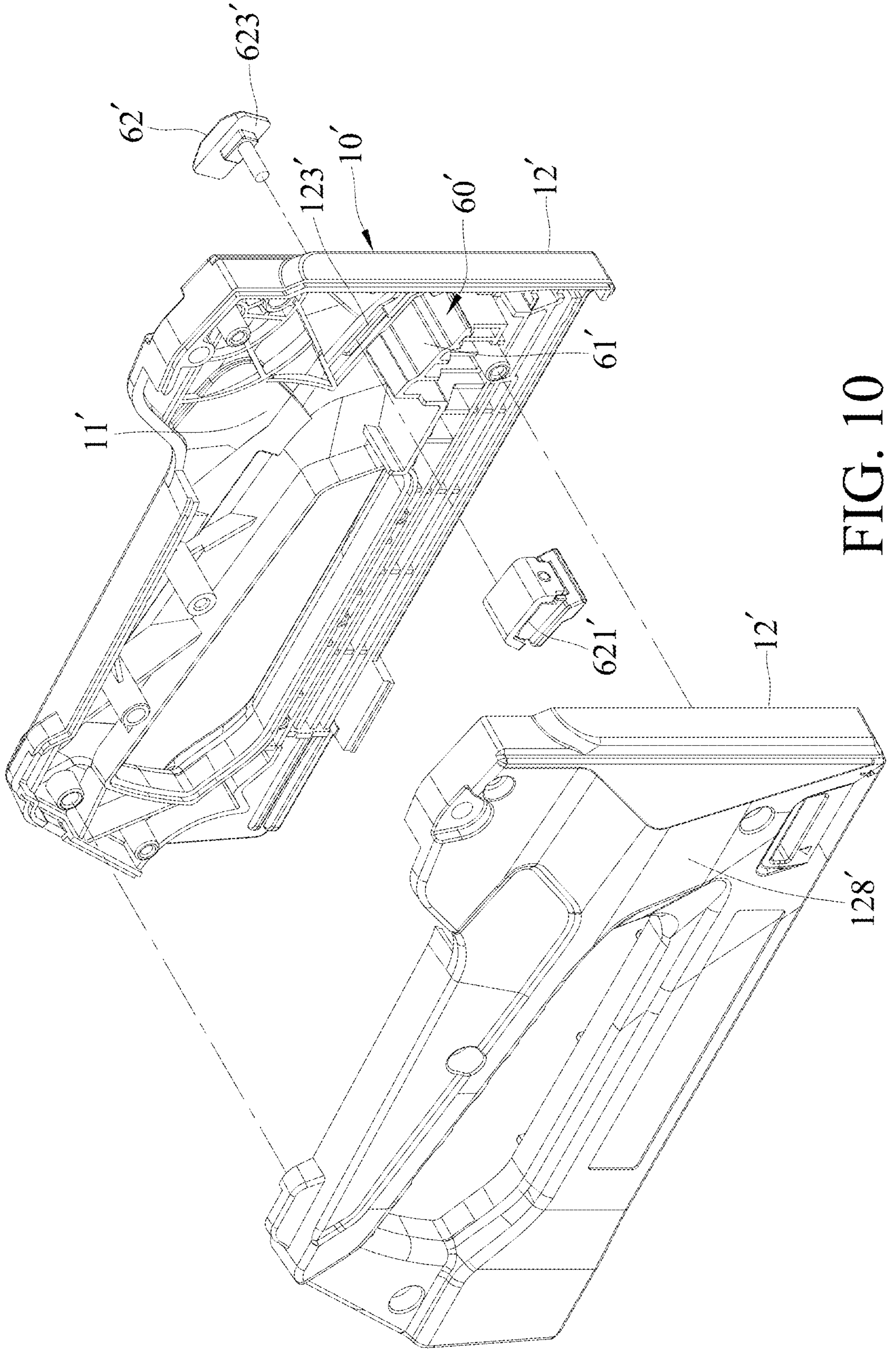
FIG. 10 is a fragmentary exploded perspective view of the second embodiment.
Figure 11:
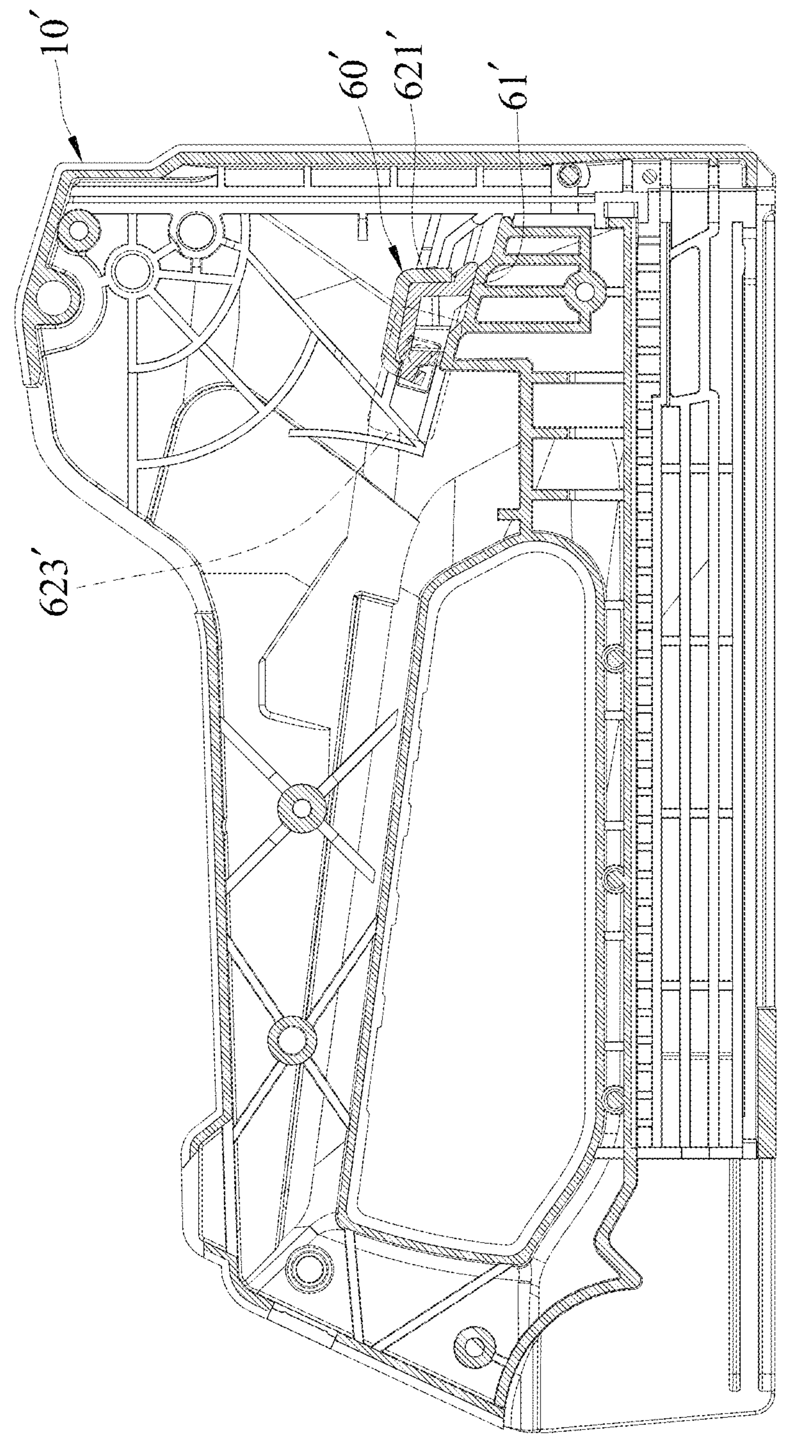
FIG. 11 is a fragmentary schematic sectional view of the second embodiment.

Referring to FIGS. 9 to 11, a second embodiment of the staple gun according to the disclosure is provided, and differences between the first and second embodiments lie in the structures and shapes of the housing unit and the force adjustment device and are illustrated in the following.

The shell bodies 12' of the housing unit 10' include a first side surface 127' extending from the top portion 121' to the bottom portion 122', and a second side surface 128' opposite to the first side surface 127', and the slide groove 123' is formed in the first side surface 127'.

The force adjustment device 60' includes the guide member 61' and the adjustment unit 62'. The adjustment unit 62' has the adjustment member 621' movably disposed on the guide member 61', and the operation member 623' connected to and operable to urge the adjustment member 621'. The operation member 623' is slidably disposed in the slide groove 123'.

In the second embodiment, the operation member 623' is directly connected to and operable to urge the adjustment member 621'; specifically, when the operation member 623' is slid relative to the slide groove 123', the operation member 623' directly urges the adjustment member 621' to move relative to the guide member 61', so that the range of movement of the force storage unit 30 (see FIG. 4) is adjusted, and that the staple-strike piece 20 may provide different striking depth and striking strength. That is to say, the second embodiment omits the connection member of the first embodiment, but achieves the same effects and object as the first embodiment.

Thus, the embodiments of the disclosure may be used with different types of the staples 80 and meet different requirements (e.g., striking depth and striking strength), and are easy to operate.

To sum up, the staple gun having the force adjustment device 60 of the disclosure has a simple structure, and is easy to assemble, which achieves the object of the disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A force adjustment device adapted to be mounted to a staple gun, the staple gun including a housing unit that has an accommodation space, a staple-strike piece that is disposed in the accommodation space and that is movable along an up-down direction, a force storage unit that is disposed in the accommodation space and that is operable to resiliently bias the staple-strike piece, a handle unit that is pivotably mounted to the housing unit, and a resilient unit that is disposed in the accommodation space and that is operable to resiliently bias the handle unit, said force adjustment device comprising:

a guide member that is adapted to be disposed in the accommodation space, and that has a first end adapted to be adjacent to the staple-strike piece, a second end opposite to said first end, and an abutment surface extending from said first end to said second end, said second end being higher in position than said first end in the up-down direction; and an adjustment unit that includes an adjustment member adapted to be disposed in the accommodation space, and movably disposed on said abutment surface, and an operation member adapted to be disposed in the accommodation space and extend therefrom to an external environment;

wherein said adjustment member is adapted to abut against and limit a range of movement of the force storage unit, and wherein said operation member is operable to urge said adjustment member to move to different positions on said abutment surface, so as to adjust the range of movement of the force storage unit.

2. The force adjustment device as claimed in claim 1, wherein said abutment surface of said guide member has at least two abutment portions that are stepped, heights of said at least two abutment portions in the up-down direction being different, said operation member being operable to urge said adjustment member to move between said at least two abutment portions.

3. The force adjustment device as claimed in claim 2, wherein said adjustment unit further includes a connection member that is pivotably connected to said adjustment member, said operation member being connected to one side of said connection member opposite to said adjustment member, and being adapted to be slidably disposed in a slide groove of the housing unit that is formed in a top portion of the housing unit and that is in spatial communication with the accommodation space.

4. A force control accessory adapted to be mounted to a staple gun, and comprising:

a force storage unit adapted to be disposed in an accommodation space of the staple gun and adapted to resiliently bias a staple-strike piece of the staple gun when the staple gun is operated; and said force adjustment device as claimed in claim 1.

5. The force control accessory as claimed in claim 4, wherein said abutment surface of said guide member has at least two abutment portions that are stepped, heights of said at least two abutment portions in the up-down direction being different, said operation member being operable to urge said adjustment member to move between said at least two abutment portions.

6. The force control accessory as claimed in claim 5, wherein said adjustment unit further includes a connection member that is pivotably connected to said adjustment member, said operation member being connected to one side of said connection member opposite to said adjustment member, and being adapted to be slidably disposed in a slide groove of the housing unit that is formed in a top portion of the housing unit and that is in spatial communication with the accommodation space.

7. The force control accessory as claimed in claim 4, wherein:

said force storage unit is a torsion spring, and has an annular portion that is adapted to be connected to the housing unit, a lever arm that is connected to one end of said annular portion, and a driver arm that is connected to another end of said annular portion; and when a handle unit of the staple gun is operated, said lever arm is adapted to be urged thereby and is allowed to bias said driver arm.

8. A staple gun comprising:

a housing unit having two shell bodies and an accommodation space that is defined by said two shell bodies, said two shell bodies having a top portion, a bottom portion that is opposite to said top portion, a slide groove that is in spatial communication with said accommodation space and an external environment, and a staple outlet that is formed in said bottom portion and that is in spatial communication with said accommodation space and the external environment;

a staple-strike piece disposed in said accommodation space and movable along an up-down direction, and corresponding in position to said staple outlet along the up-down direction;

a force storage unit disposed in said accommodation space and operable to resiliently bias said staple-strike piece;

a handle unit pivotably mounted to said housing unit, and operable to make said force storage unit bias said staple-strike piece;

a resilient unit disposed in said accommodation space, and operable to resiliently bias said force storage unit and said handle unit; and said force adjustment device as claimed in claim 1;

wherein said guide member is disposed in said accommodation space, said first end being adjacent to said staple-strike piece, said adjustment member being disposed in said accommodation space, said operation member being disposed in said accommodation space, extending from said accommodation space to the external environment, and being slidably disposed in said slide groove.

9. The staple gun as claimed in claim 8, wherein said abutment surface of said guide member has at least two abutment portions that are stepped, heights of said at least two abutment portions in the up-down direction being different, said operation member being operable to urge said adjustment member to move between said at least two abutment portions.

10. The staple gun as claimed in claim 9, wherein:

said slide groove of said housing unit is formed in said top portion of said housing unit; and said adjustment unit further includes a connection member that is pivotably connected to said adjustment member, said operation member being connected to one side of said connection member opposite to said adjustment member.

11. The staple gun as claimed in claim 8, wherein:

said force storage unit is a torsion spring, and has an annular portion that is connected to said housing unit, a lever arm that is connected to one end of said annular portion, and a driver arm that is connected to another end of said annular portion; and said lever arm is operable to be urged by said handle unit and is allowed to bias said driver arm.

12. The staple gun as claimed in claim 8, further comprising a staple storage unit that is detachably mounted to said housing unit, and that is adapted to store multiple staples.

13. The force adjustment device as claimed in claim 1, wherein said guide member is adapted to be integrally formed in the accommodation space of the housing unit.

* * * * *